US009552674B1

(12) United States Patent
Jayadevaprakash et al.

(10) Patent No.: US 9,552,674 B1
(45) Date of Patent: Jan. 24, 2017

(54) ADVERTISEMENT RELEVANCE (71) Applicant: A9.com, Inc., Palo Alto, CA (US)

(72) Inventors: Nityananda Jayadevaprakash, San Jose, CA (US); William Brendel, San Francisco, CA (US); David Creighton Mott, Los Altos, CA (US); Scott Paul Robertson, Mountain View, CA (US)

(73) Assignee: A9.com, Inc., Palo Alto, CA (US)

( * ) Notice: Subject to any disclaimer, the term of this patent is extended or adjusted under 35 U.S.C. 154(b) by 226 days.

(21) Appl. No.: 14/226,533

(22) Filed: Mar. 26, 2014

(51) Int. Cl.
*G06T 19/00* (2011.01)
*G06Q 30/06* (2012.01)
*G06T 15/50* (2011.01)

(52) U.S. Cl.
CPC ......... *G06T 19/006* (2013.01); *G06Q 30/0623* (2013.01); *G06Q 30/0643* (2013.01); *G06T 15/50* (2013.01)

(58) Field of Classification Search
None
See application file for complete search history.

(56) References Cited

U.S. PATENT DOCUMENTS

2007/0038944 A1* 2/2007 Carignano .............. G06T 15/20
715/757
2014/0210858 A1* 7/2014 Kim ....................... G06T 19/006
345/633
2015/0207960 A1* 7/2015 Tomlinson ........... H04N 1/6077
382/167
2015/0228122 A1* 8/2015 Sadasue ................ G06T 19/006
345/633

OTHER PUBLICATIONS

Kan, Tai-Wei, Chin-Hung Teng, and Mike Y. Chen. "QR code based augmented reality applications." Handbook of Augmented Reality. Springer New York, 2011. 339-354 (hereinafter Kan 2011).*
Kan, Tai-Wei, Chin-Hung Teng, and Wen-Shou Chou. "Applying QR code in augmented reality applications." Proceedings of the 8th International Conference on Virtual Reality Continuum and its Applications in Industry. ACM, 2009 (hereinafter Kan 2009).*
Kanbara, Masayuki, and Naokazu Yokoya. "Real-time Estimation of Light Source Environment for Photorealistic Augmented Reality." ICPR (2). 2004.*

* cited by examiner

*Primary Examiner* — Jacinta M Crawford
*Assistant Examiner* — Diane Wills
(74) *Attorney, Agent, or Firm* — Hogan Lovells US LLP (57) ABSTRACT

Systems and methods for displaying an image of a virtual object in an environment are described. A computing device is used to capture an image of a real environment including a marker. One or more virtual objects which do not exist in the real environment are displayed in the image based at least on the marker. The distance and orientation of the marker may be taken into account to properly size and place the virtual object in the image. Further, virtual lighting may be added to an image to indicate to a user how the virtual object would appear with the virtual lighting.

20 Claims, 9 Drawing Sheets

ADVERTISEMENT RELEVANCE

BACKGROUND

Computing devices are often used to make purchases. A user of a computing device can use their computing device to make an online purchase. There are various electronic marketplaces for the user to engage in online shopping. Online electronic marketplaces often provide pictures, descriptions, and other information for their products. Unlike in-store shopping at a physical retail store, online shopping does not allow the user to examine the item in a real setting. For some items, such as lower cost products, providing a picture of the product and a description online is often sufficient for a user to make a purchase. However, for more expensive items, such as a painting, providing pictures and a description online might not provide the user with enough comfort to make the purchase online without first seeing the painting in person. In addition, an item like a painting can be difficult to return if the user is not happy with their purchase. Accordingly, it would be beneficial to provide the user with additional information, perspective, and/or interactivity in viewing, examining, and/or considering one or more items of interest prior to purchase.

BRIEF DESCRIPTION OF THE DRAWINGS

Various embodiments in accordance with the present disclosure will be described with reference to the drawings, in which.

DETAILED DESCRIPTION

Systems, devices and methods in accordance with various embodiments of the present disclosure may overcome one or more of the aforementioned and other deficiencies experienced in conventional approaches to providing users with information online about physical objects using electronic data. In particular, various embodiments herein describe one or more virtual objects for display using an electronic/computing device, where each virtual object depicts one or more corresponding physical objects. For example, a virtual object can be a graphical depiction and/or representation of a physical object, such as a piece of furniture, a decoration, a piece of art (e.g., sculpture, sketch, painting, photograph, poster, etc.), an appliance, a textile (e.g., rug, curtains, bed sheet, etc.), a wall, a household item, etc.

In some embodiments, the various embodiments of the present disclosure can improve an online shopping experience for a user. For example, suppose a user is considering purchasing an expensive painting (e.g., $5,000) that is available through an online electronic marketplace for placement above a couch in her living room. It would be beneficial if the user could, prior to purchase, view the painting hanging above the couch without having the painting shipped to her house. In some embodiments described herein, the user, in order to view the painting on her wall, may place a two-dimensional marker (e.g., QR code) on the wall in approximately the area she would place the painting.

Using her computing device (e.g., tablet), the user can now view the wall with the QR code through the computing device's display. The computing device, sampling a video frame, can determine that the size of the marker in the image is 200 pixels on the display screen. The device can also determine that the real, physical marker size is, for example, 8 inches by 8 inches, and that the physical painting is 3 feet by 4 feet. Thus, a user can view a virtual painting in near-real time by simply pointing their computing device at a marker.

Based on this information (i.e., the information about the marker and the information about the real painting), the computing device can determine the size of a virtual representation of the painting to be presented in a camera view (also referred to as a camera environment) rendered in the display screen such that the painting is displayed in the camera view with perspective distortion that matches the camera's perspective. The computing device can also detect lighting conditions surrounding the area where the marker has been placed to replicate those lighting conditions onto the virtual painting and the real-world environment displayed in the screen.

In some embodiments, a user interacting with a computing device can access an online marketplace to browse various products. In response to a user's command, a virtual object shown in a camera view can be substituted with another virtual painting, a virtual television, or another virtual object the user may want to view. In some embodiments, more than one virtual object may be displayed, for example, when more than one marker is viewed through the computing device. In some embodiments, one marker can cause more than one virtual object to be displayed. For example, a set of three paintings may be displayed in camera view response to a computing device viewing only a single marker in the real-world environment displayed in the screen.

In some embodiments, the user can select different objects, paintings, or televisions to determine which object fits best in their home. The user can see a virtual representation on the display of their device of how the painting (or other object) would look in the space above their couch. Thus, the user can make a more informed purchase, which may reduce the likelihood that the user returns an expensive painting or other object.

Moreover, in some embodiments, an amount of distortion shown in a camera view to the virtual object may be based on an amount of distortion present on a marker. There are many types of distortion. For example, the marker may be distorted because it is covered in part or whole by a shadow. In such an example, the camera view will include the shadow. As another example, the marker may be distorted by lighting. The lighting on the marker can indicate that an amount, type, or color of light is projected onto the marker. In such an example, the camera view, including the virtual object, will show the amount, type, or color of light based on the lighting in the physical world. In some embodiments, a direction of light may be displayed on a marker. In such an example, the camera view includes light in the direction as shown on the marker. In some embodiments, only a portion of a marker is visible from the point of view of a computing device because another object is blocking the view of the entire marker. In this example, the virtual object in the camera view will be blocked by the object blocking the marker.

Figure 1:
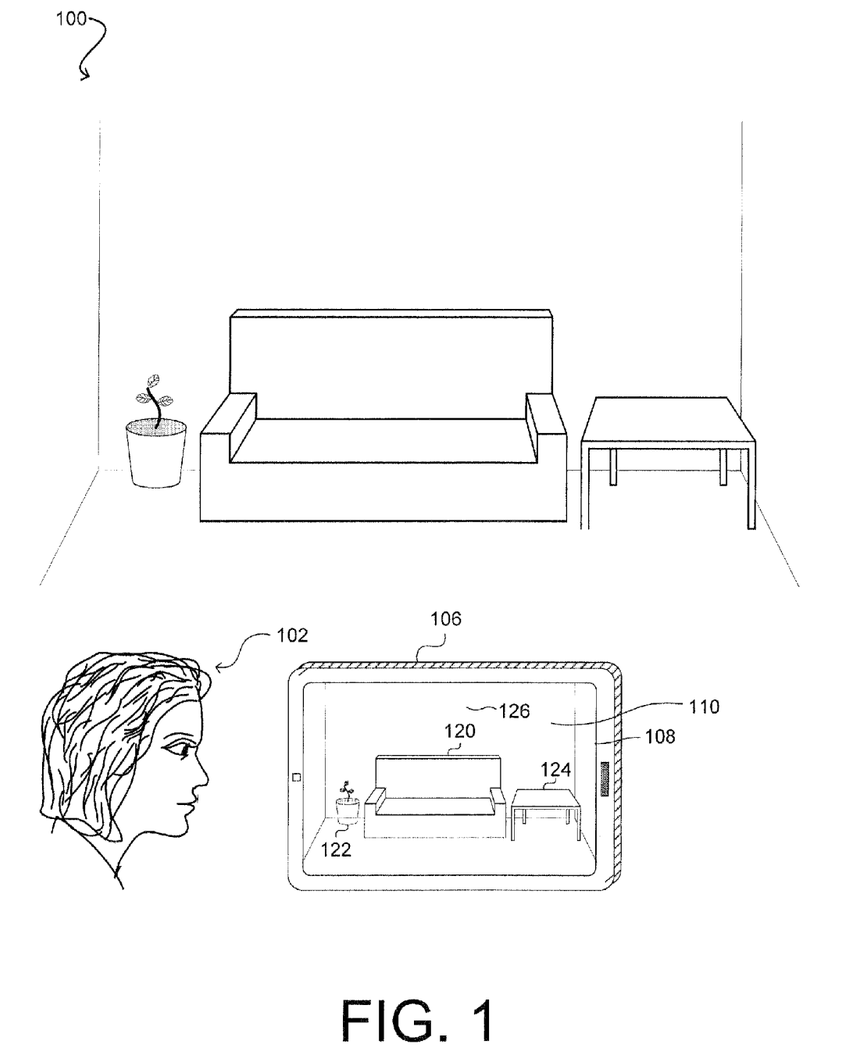
FIG. 1 illustrates an example environment in which various embodiments can be utilized, in accordance with at least one embodiment.

FIG. 1 illustrates an example environment 100 in which various embodiments can be utilized. In FIG. 1, a user 102 is shown interacting with a computing device 106. The computing device 106 includes, among other things, a display screen 108 and at least one camera. The user 102 can interact with the computing device to view a camera view 110 of an image (e.g., a real-time video feed) received via a camera. The camera view 110 depicts features in the real-world environment that are viewable to the camera including, for example, a couch 120, a plant 122, a table 124, and a wall 126. It should be understood that image data shown in the camera view 110 may be in the form of a frame of a video or an image. For example, a user 102 may capture video (in real-time or otherwise) of an environment that includes a marker. The marker can then be substituted in the camera view by a virtual object within the video using the techniques described in this specification. As such, when the user moves about a room with a device 106 viewing the marker, the device will display video in camera view (i.e., as if the virtual object were a part or the real-world environment). The camera view may be shown live, or in near real-time.

Figure 2A:
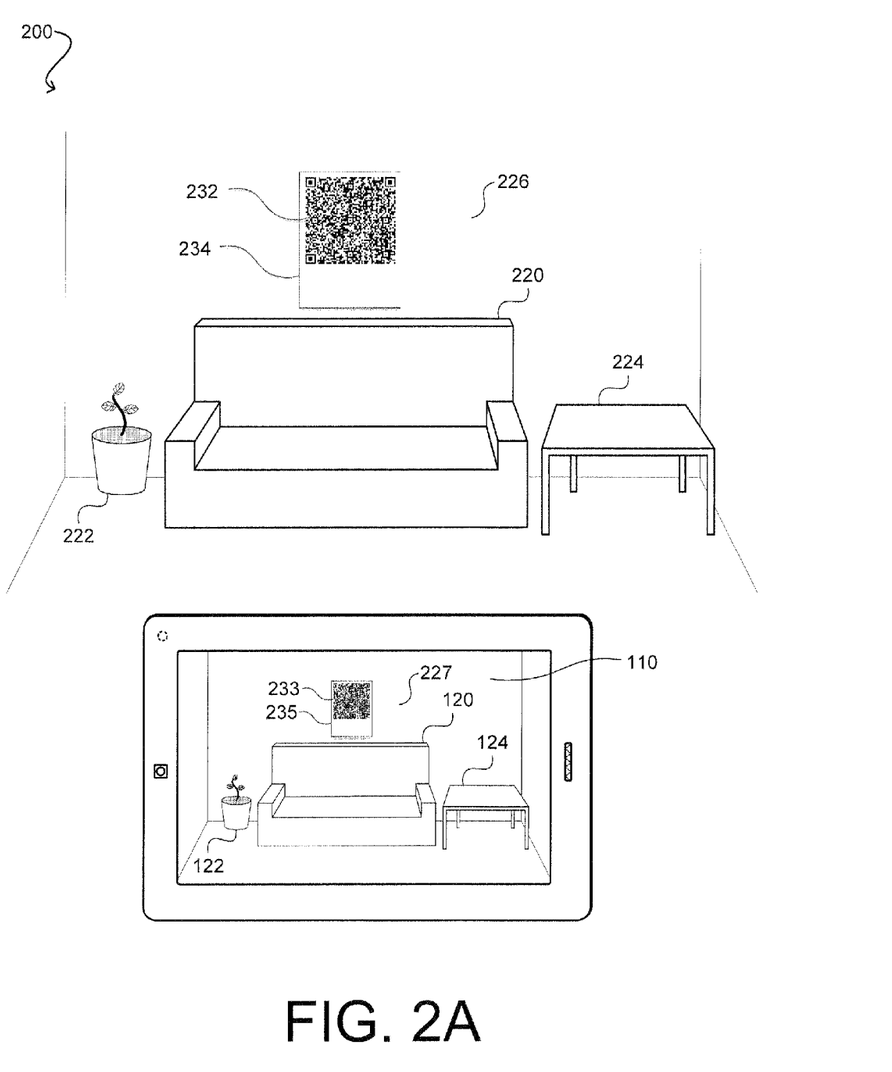
FIG. 2A illustrates an example environment in which various embodiments can be utilized, in accordance with at least one embodiment.

FIG. 2A illustrates an example environment 200 in which various embodiments can be utilized. In FIG. 2A, the real-world environment includes a room with a wall 226. The room also includes a couch 220, a plant 222, and a table 224. A marker 232 printed on a surface 234 (e.g., piece of paper) is also shown hanging on the wall 226 in the real-world environment. The marker may include different types of objects. For example, a marker can be a cover of a magazine, a newspaper, a book, a piece of paper, a quick response (QR) code, a barcode, a grid, a colored grid, or any other object with a known dimension. In some embodiments, a user can obtain an image of the marker 232 and print it onto a piece of paper. The image of the marker may be obtained, for example, from an online marketplace. In some embodiments, the image of the marker may be received by the user via mail. A marker may include embedded information. For instance, a marker may include information associated with a uniform resource locator (URL). The URL could contain an image and/or data corresponding to a virtual object.

Figure 2B:
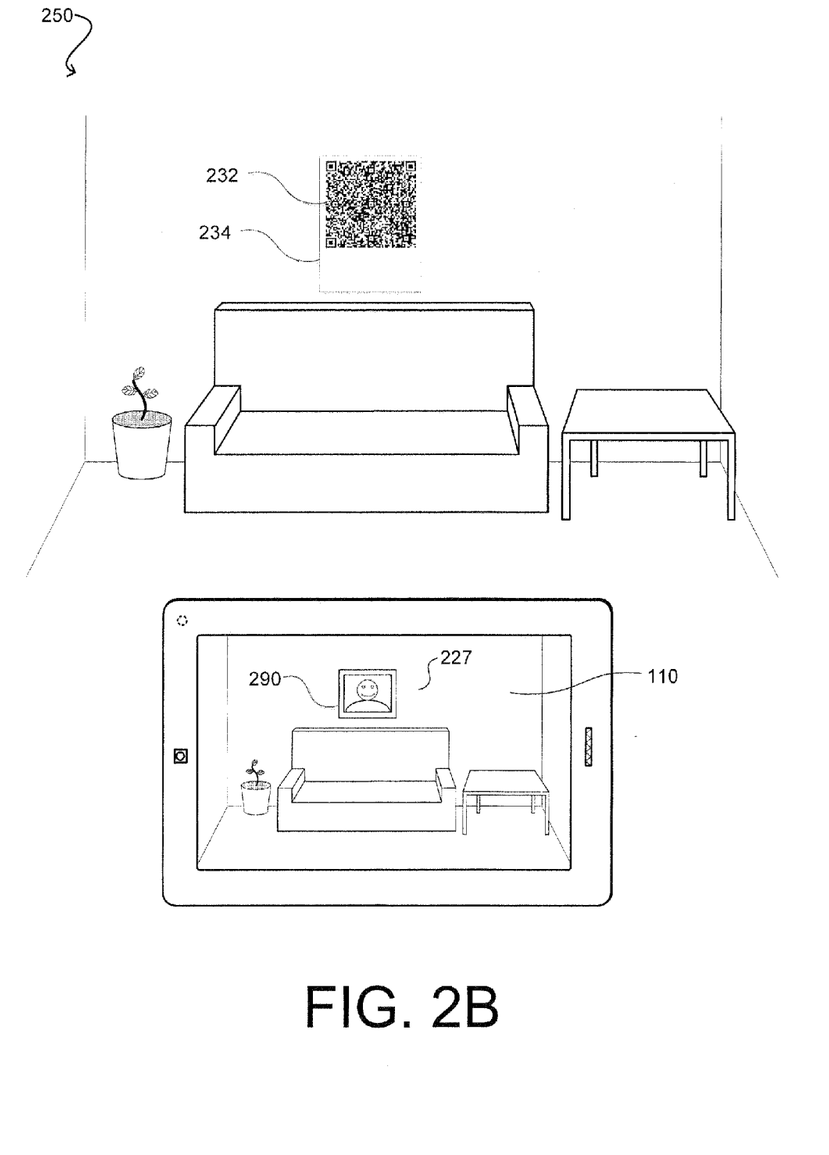
FIG. 2B illustrates an example embodiment for viewing objects in reality and viewing virtual objects, in accordance with at least one embodiment.

FIG. 2A also illustrates an example computing device. The display screen may display a camera view 110 of an environment. It should be understood that the camera view 110 shown in FIG. 2A shows a marker and not a virtual object. Typically, a user will not see the marker in a camera view, and instead see a virtual object. In some embodiments, a camera view 110 showing a virtual object is displayed in response to an application being executed (or opened) on a computing device. The camera view 110 also includes objects found in the real-world environment, such as a couch 120, a plant 122, a table 124, a wall 227, etc. Using the example of the user wanting to view a painting on her wall 226, she has placed the marker 232 on the real-world wall 226 above the real-world couch 220. The user can then interact with the computing device to see the real-world environment through the camera view 110, which shows, in this example, the marker 233 on the wall 277 above the couch 120. The device then overlays a virtual object that depicts the painting over the marker 233, as shown in FIG. 2B. FIG. 2B illustrates that the device, based on recognizing the QR code 232, overlays a representation of the painting 290 in the environment 250 (in a camera view) in place of the marker 232. This allows the user to view how painting 290 would look when placed on the wall 227 in the camera view. The camera view 110 includes a virtual object 290, that has replaced the marker 232 shown in the real-word environment. In some embodiments, the object 290 may be overlaid on top of the marker 232. In some embodiments, the marker may be removed from the camera view 110 and replaced with the object 290. Moreover, in some embodiments the surface 234 that a marker is printed on may be recognized, and replaced in the same manner as the marker 232. Regardless of the manner, at least one virtual object 290 is shown in camera view 110 instead of a marker 232.

A user is not required to stand directly in front of the surface (e.g., wall 227) that the user intends to have the virtual object rendered on. For example, the user may view the real-world wall through display while the device is positioned at an angle to the real-world wall. In such a case, the computing device will use the plane of the marker 232 in relation to the device to render the virtual object 290 (a painting in FIG. 2B) in the camera view 110 in substantially the same plane as the marker 232. In some embodiments, the plane that the virtual object 290 may be shown in the camera view based at least in part on a plane of the marker 232 in the received image.

In some embodiments, the size of the virtual object in the camera view is based at least in part upon information included in a two-dimensional marker 282 placed on a wall. For example, the size of a 3'×4' painting may be embedded in a QR code. The QR code may also include information indicating that the QR code is 8"×8". Thus, by obtaining the size of a virtual object to display, and the size of the marker, it is possible to display the virtual object correctly scaled in a camera view 110 based on the size of the marker, or QR code in this case.

In one example, the size of an object may be based on a combination of information embedded in a marker, and the distance between a computing device and the marker 232. For example, the size and or scale of a virtual object may be determined as discussed above. In addition, the computing device may be configured to determine a distance between the computing device and a marker. In such an example, the distance between the computing device and the marker may be used as an additional data point when determining the size of the virtual object in a camera view 110.

Figure 3:
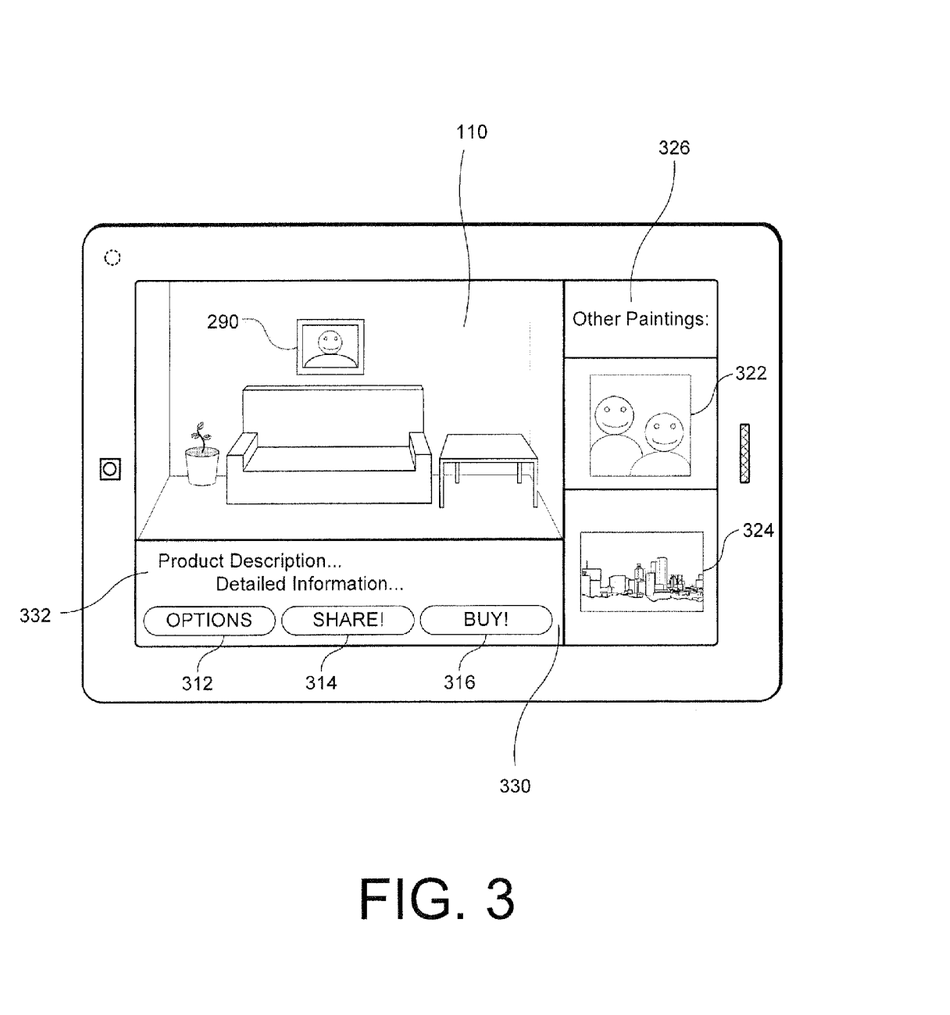
FIG. 3 illustrates an example user interface, in accordance with at least one embodiment.

FIG. 3 illustrates an example user interlace (UI) 300, in accordance with at least one embodiment. The user interface allows a user to view a virtual object, e.g., the virtual object 290, in a camera view 110 to see how they like the item that the virtual object depicts, flip through different available objects, and place in various places in a camera view for viewing, purchasing, sharing, etc. In FIG. 3, the user interface 300 is displaying an online marketplace 330. A user 102 is able to interact with the device 300 to access the online marketplace 330 to browse and/or search an inventory of objects 326 that are available for purchase. Objects available for purchase may include art, posters, appliances, frames, portraits, sculptures, furniture, etc. As shown in FIG. 3, in conjunction with displaying an online marketplace 330, the user interface allows a user to see the camera view 110 of the environment.

The user can select the virtual object 290 from the inventory of objects 326 in the online marketplace 330. Once selected, information 332 about the virtual object can be presented in a camera view, as described above. For instance, the information 332 may disclose the name of a painting, information about the painting, and the price of the painting. Further, an online marketplace may allow a user to share a screenshot of the virtual object in a camera view on a social network, via email, multimedia message, etc. A user may do this by manipulating a widget, or pressing a button 314. In some embodiments an online marketplace allows a user to store an object, and/or an image of a virtual object in a camera view. This way, various virtual objects as shown in a camera view may be compared later. In some embodiments, saved camera views may be compared side-by-side on the display of the computing device.

In some embodiments, a user may buy the object by manipulating a widget or pressing a button 316. Further, an online marketplace may provide other functionality, such as the ability to adjust the lighting, by manipulating a widget or pressing a button 312. In some embodiments, a user may select other objects from an inventory of objects 326 to replace the object shown in the camera view. This way, a user can see what other objects 322 and 324 may look like in a camera view. For example, a user may decide that one object is too big for the real-world environment (e.g., a painting may be too large to hang above a couch). In such a case, the user may choose another painting 322 and 324 that fits within the real-world environment. In some embodiments, the computing device will only allow the user to select objects based on other objects in the real-world environment. For example, the device may only allow a user to select a painting that would fit above a couch and below a ceiling. As another example, the device may notify the user if the object will not fit within a particular real-world environment.

Figure 4:
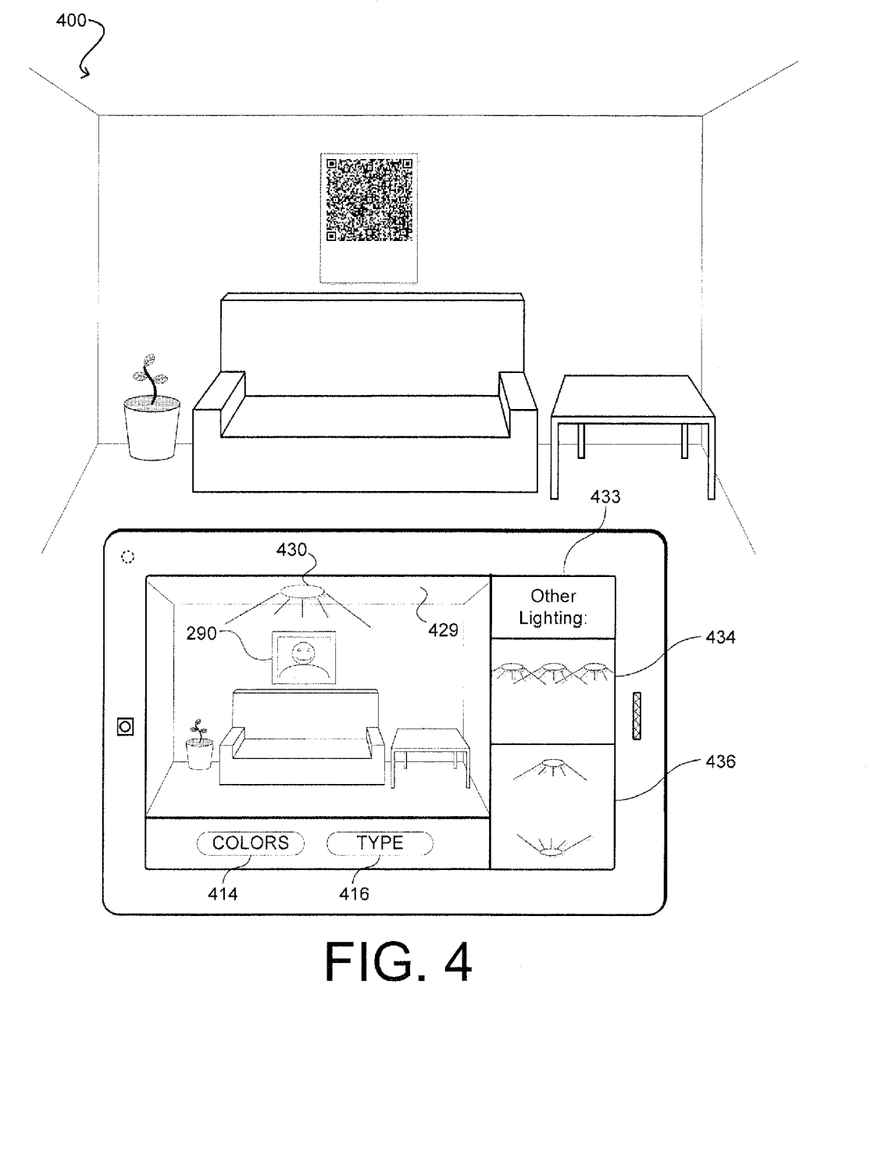
FIG. 4 illustrates an example device with a display for viewing objects, in accordance with at least one embodiment.

FIG. 4 illustrates an environment 400 including a device displaying an example of how a user may modify or alter the lighting surround the virtual object 290 in the camera view. In this instance, the ceiling 429 above where the user would like to place the painting (shown as virtual object in FIG. 4) includes a lighting device 430. In some embodiments, the user can provide information about the lighting device 430 (e.g., recessed light, LED bulb, wattage, etc.) so that the device can modify the lighting in the camera view. For example, as shown in FIG. 4, the UI provides a Colors radio button 414 that will allow the user to select the color of the lighting emitted by the lighting device 430 and a Type radio button 416 that will allow the user to select the type of light (e.g., LED, fluorescent, CFL). In other embodiments, the device detects the environmental lighting without user interaction. For example, a computing device may determine the environmental lighting in the real-world by sampling a video frame. The computing device may detect the angle of light on the maker, the color of light on the marker, etc., and use that information to modify (e.g., distort) the camera view. The computing device may also use such information to modify light rendered on a virtual object.

FIG. 4 also illustrates that the UI may also allow the user to select other lighting options in place of the existing lighting currently available (e.g., light fixture 430). In this instance, other lighting options are provided via a lighting widget 433. The widget 433 allows a user to view various different lighting arrangements 434 and 436 to replace, in this example, lighting device 430, to view how these various lighting arrangements would affect the light directed onto the virtual object in a camera view. A ceiling in the camera view 429 comprising lighting device 430 may be shown in the camera view. This allows a user to manipulate the position of the lighting device(s). For example, a user may move a light fixture 430 by touching the screen and/or dragging the light fixture 430 with their finger. With each change in type, color, or direction of light, the lighting fixture 430 shown on virtual object may change. In some embodiments, the new lighting 430 will be rendered onto the real-world objects shown in the camera view (e.g., increased light, shadows, etc.) to show the effects or changing the light type, color and so on. For example, if the virtual object shown in the camera view is a large maroon colored painting, the color or tone of a real-world object near the painting (e.g., the wall behind the painting, the couch below the painting) may be affected as the color of the painting may bleed or reflect onto these real-world objects.

Figure 5:
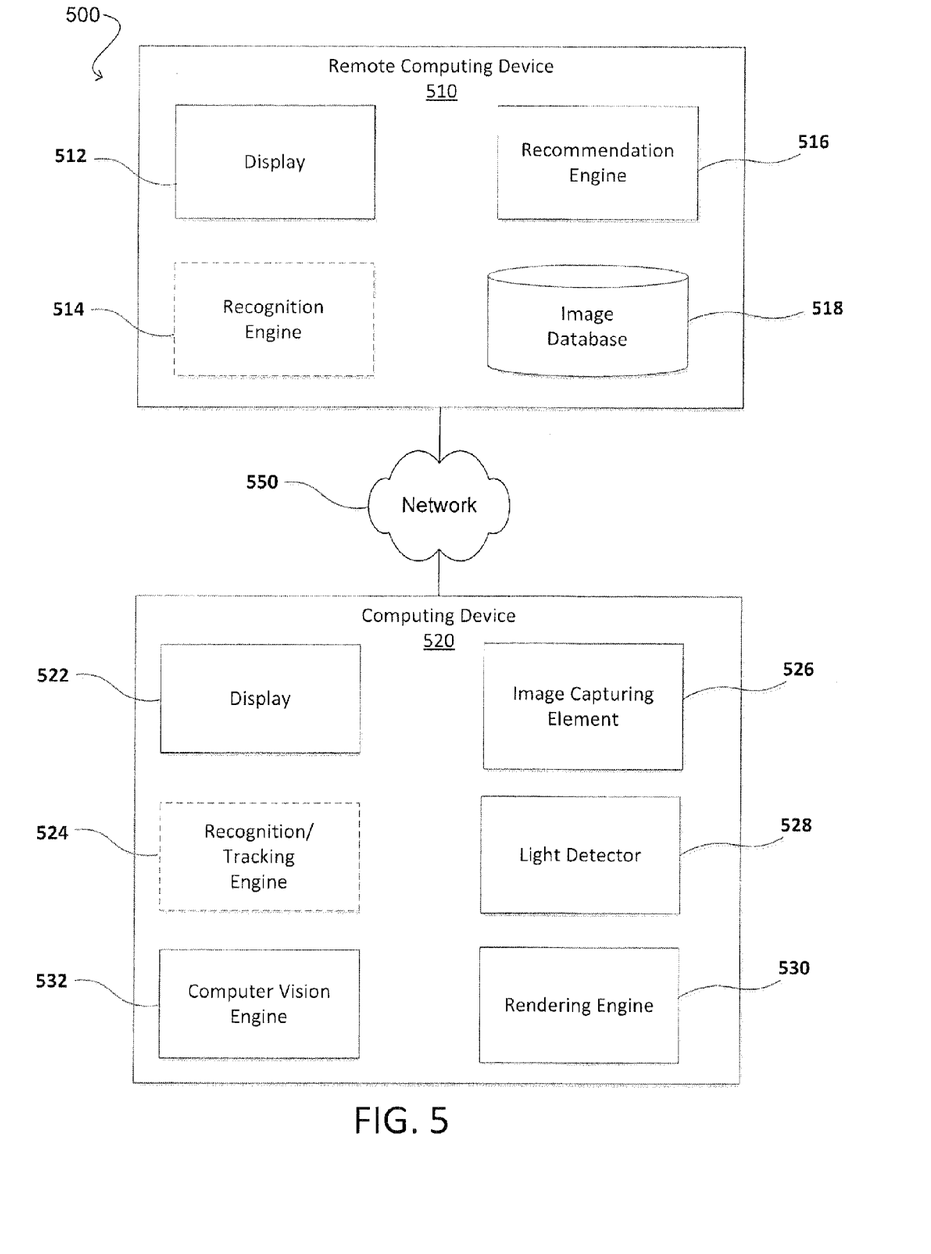
FIG. 5 illustrates components of example devices, in accordance with at least one embodiment.

FIG. 5 illustrates an example arrangement 500 of electronic devices and their components. In some embodiments, electronic/computing device 520 comprises at least one display 522, a recognition engine 524, at least one image capturing element 526, at least one light detector 528, a rendering engine 530, and a computer vision engine 532. Example arrangement 500 is merely an example of how a system could be configured, and may include more or fewer components. Also, the components in example arrangement 500 may be interchanged, and perform tasks performed by other components described herein. In some embodiments, the display is configured to show a user an online marketplace, and camera views of a real-world environment. The image capturing element is configured to capture images and videos, triangulate distances, and assist the tracking engine with tracking markers by sending the tracking engine data associated with video, an image, markers, etc. The recognition/tracking engine may be located in the computing device 520, a remote computing device 510, or both. The recognition/tracking engine is configured to recognize a marker, the size of a marker, the plane a marker is located on, the orientation of a marker, etc. The recognition/tracking engine may also track the marker as well, for example by following a QR code wherever it appears in a video. In some embodiments, the marker may indicate that more than one virtual object is to be placed in the camera view. In various embodiments, a light detector 528 is coupled with the computing device 520 to capture light at the computing device 520, or at another location such as a wall, wireless light detecting element, or at a marker. In some embodiments, a light detecting element is remote from a computing device. In any of these embodiments, the light detecting element is configured to adjust, or at least assist with adjusting, the lighting shown in a camera view. In further embodiments, a computer vision engine 532 is located in the computing device 520. The computer vision engine might determine the size of a room based on images or video of the room. In some embodiments the computer vision engine is configured to determine whether a virtual object fits within a real-world environment. As discussed above, the components shown in computing device 520 may perform some or all of the functions of other components. Thus, for instance, computer vision engine 532 may be configured to recognize a marker instead of, or in addition to a recognition/tracking engine 524. It should be understood that, in some embodiments, methods discussed herein may be performed on a client computing device 520 without the need to transfer information to and/or from a remote computing device 510.

FIG. 5 further illustrates an optional example remote computing device 510. In some embodiments, remote computing device 510 is configured to perform at least a portion of the processing required to enable embodiments described herein, such that the computing device 520 can include fewer components, thus reducing the weight of computing device 520. Remote computing device 510 may be coupled to computing device 520 wirelessly via network 550. Remote computing device 510 may be any type of computing device including, but not limited to: a server, a plurality of servers, a laptop computer, a portable electronic device, a wearable computer, etc. A remote computing device may comprise a display 512, a recognition engine 514, a recommendation engine 516, and an image database 518. Display 512 may be used, in some embodiments, to display images received by the computing device 520. An optional recognition engine 514 may be configured to recognize markers, their associated size, orientation, lighting, etc. Recommendation engine 516 may serve a variety of purposes. For example, the recommendation engine may be configured to determine the size of a room based on one or more images captured of that room. The camera view of a real-world environment may be based on the relative size of a room or wall based on information from the recommendation engine, or a computer vision engine, for example.

In some embodiments, an image database 518 may include at least one marker and/or object for the system. Of course, in some embodiments, one or more markers and/or objects may be stored on the computing device as well. For example, a marker may be stored on a client computing device and when the marker is recognized a virtual object replaces/overlays the marker. In some embodiments, a particular product or category of products may correspond to a particular marker. In some embodiments a computing device (remote or otherwise) may be configured to compare a received image of a marker with markers stored on the client computing device 520. In other embodiments, an image database may comprise objects which are received by the computing device and displayed in a camera view.

Figure 6A:
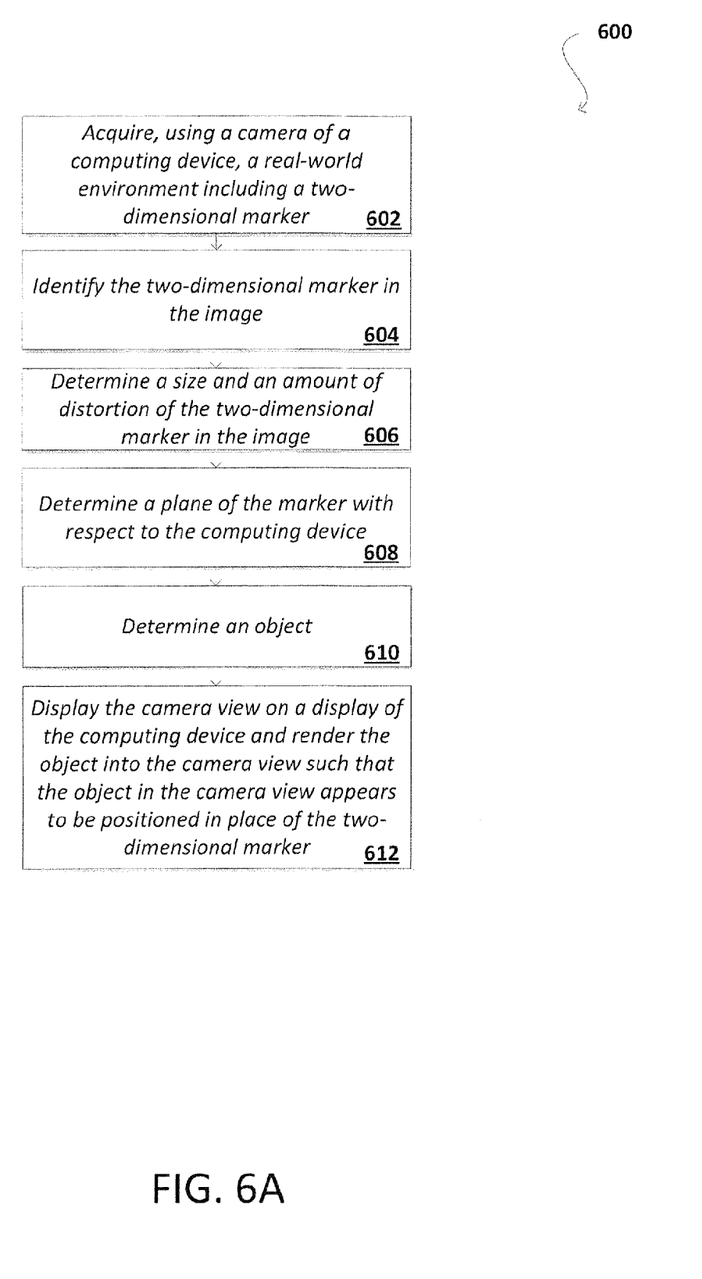
FIG. 6A illustrates an example method for rendering an image, in accordance with at least one embodiment.

FIG. 6A illustrates an example method 600 for providing a camera view containing real-world objects and at least one virtual object. It should be understood that there can be additional, fewer, or alternative steps performed in similar or alternative orders, or in parallel, within the scope of the various embodiments unless otherwise stated. The example method 600 begins, at 602, with a computing device capturing, using its camera, a real-world environment that includes a two-dimensional marker. The camera may capture one or more images, including sampling a video frame. In some embodiments, an input may be received causing the computing device to capture an image. For example, a user may want to take a picture of an environment including a two-dimensional marker at a particular angle. In other embodiments, a frame is sampled by the computing device as the user is viewing the environment through the device's camera. At 604, the two-dimensional marker is identified by a client computing device. In some embodiments, the client computing device may send data describing the real-world environment (e.g., a sampled frame of video) to a server that identifies the two-dimensional marker. The two-dimensional marker may be a QR code and include embedded data. The two-dimensional marker may be recognized by any feature detection method known in the computer vision art, such as corner detection, blob detection, edge detection or thresholding and/or other image processing methods. At 606, a size and an amount of distortion of the two-dimensional marker may be determined. In some embodiments, the size is determined based in part on information embedded in the QR code. In some embodiments, the distortion may include, but is not limited to: lighting conditions, lighting arrangements, objects blocking the line of sight between the at least one camera and the marker, etc.

In some embodiments, a plane of the marker is determined with respect to the computing device, at 608. For example, if the received image of the two-dimensional marker appears distorted such that one portion appears larger than another portion (e.g., one edge of the marker is larger than the other edge). Based on this distortion, a plane of the marker may be determined. For example, the computing device may be able to determine that the plane of the marker is substantially perpendicular to the line of sight of the device's camera if the device detects that the two edges of the marker are the same distance apart (e.g., the top edge and the bottom edge are the same size). Similarly, the computing device may also be able to determine that the plane of the marker is at an angle with respect to the user's line of sight when it detects that two edges of the marker are not the same distance apart.

In some embodiments, an object is determined 610. As discussed herein, data associated with the object may be embedded in the QR code, or a generic QR code may be used and an object determined by the client computing device may be placed in the camera view based on the QR code. The item may be any product available for purchase or rent through an online marketplace or a physical retail store such as, by way of example only, art, an appliance, a mirror, furniture, landscaping, etc. Next, the camera view is displayed on the computing device 612. As discussed above, the camera view includes objects from the real-world and virtual objects positioned based on the two-dimensional marker. In various embodiments, the object is modified based on information embedded in the two-dimensional marker and/or distortion associated with the two-dimensional marker. Further, the object may be placed such that it appears to be positioned in place of the two-dimensional marker. In some embodiments, the user is able to move or orient the virtual object relative to the marker, to adjust the placement of the virtual object in the scene.

Figure 6B:
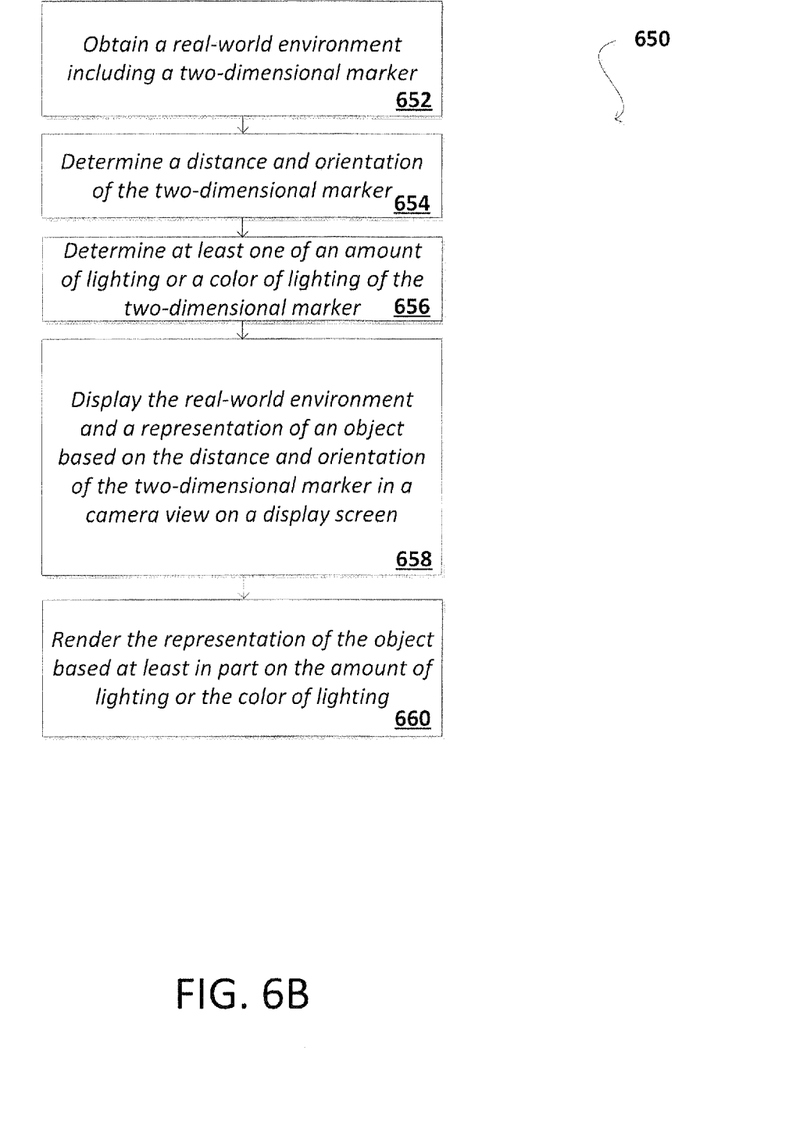
FIG. 6B illustrates an example method for rendering an image, in accordance with at least one embodiment.

FIG. 6B illustrates an example method 650 for providing a camera view containing real-world objects and at least one virtual object. It should be understood that there can be additional, fewer, or alternative steps performed in similar or alternative orders, or in parallel, within the scope of the various embodiments unless otherwise stated. The example method 650 can start with obtaining a real-world environment 652. The real-world environment may be acquired by sampling a frame of a plurality of frames being captured by a camera of a computing device. A distance and orientation of a two-dimensional marker represented in the image is then determined 654. In some embodiments, the orientation may be determined based on the rotation of the marker represented in the image, or the orientation may determined based on the angle of the marker represented in the image.

In some embodiments, at least one of an amount of lighting or a color of lighting of the two-dimensional marker is determined 656. The amount of lighting or the color of lighting may be determined with a light detector, which can be coupled with a computer device or remote from a computer device. The amount of lighting or the color of lighting may also be determined based on the lighting indicated on the marker (e.g., by determining the amount of light or the color of the light on the marker), or by detecting amounts of light on areas surrounding the marker on the wall or floor. Next, the camera view is displayed 658. In some embodiments, the real world environment and a representation of an object are displayed in the camera view. The representation of the object may be based on the distance and orientation of a marker. In various embodiments, an object selected from an online marketplace may be shown on the display as if it were at the same distance and orientation of the marker. The representation of the object is rendered based at least in part on an amount of lighting or color of lighting 662. In some embodiments, light can be added, removed, modified, moved, have its color changed, etc.

Figure 7:
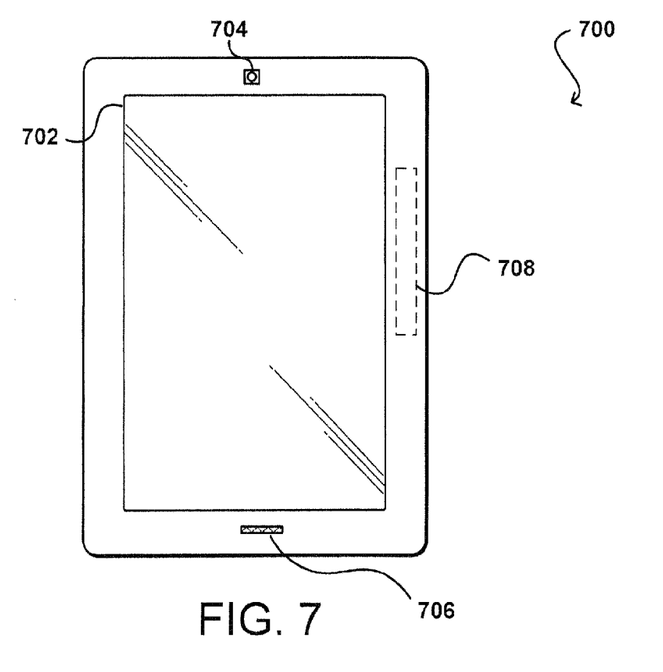
FIG. 7 illustrates an example an example device that can be used to implement aspects of the various embodiments, in accordance with at least one embodiment.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. An orientation sensor may be used to determine an angle of a plane associated with a two-dimensional marker with respect to the computing device. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
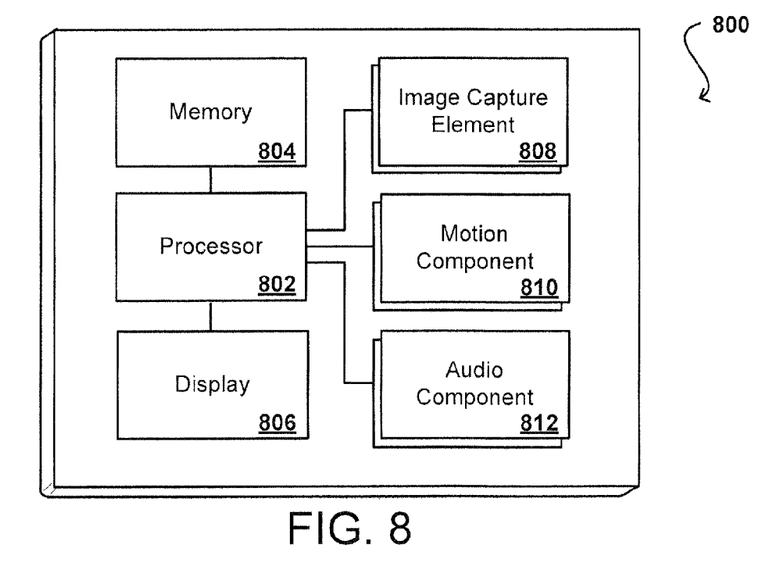
FIG. 8 illustrates an example components of a client device such as that illustrated in FIG. 7, in accordance with at least one embodiment.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni-directional or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

As discussed above, the various embodiments can be implemented in a wide variety of operating environments, which in some cases can include one or more user computers, computing devices, or processing devices which can be used to operate any of a number of applications. User or computing devices can include any of a number of general purpose personal computers such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks. Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device comprising:
   at least one processor;
   a camera;
   a display screen; and
   memory including instructions that, when executed by the at least one processor, cause the computing device to perform a set of operations comprising:
     sample a frame of video, using the camera, of a real-world environment including a quick response (QR) code, wherein information embedded in the QR code is associated with a first object;
     identify the QR code in the frame;
     determine a size and an amount of distortion associated with the QR code;
     determine a plane of the QR code in the frame with respect to the computing device;
     render a camera view of the real-world environment for display in the display screen, the camera view including a representation of the first object in place of the QR code;
     determine a second object;
     remove the representation of the first object in the camera view; and
     render the camera view to include a representation of the second object in the camera view, wherein the representation of the second object is rendered with a relative size and amount of distortion such that the representation of the second object appears to be positioned in place of the QR code.

2. The computing device of claim 1, wherein the instructions, when executed by the processor, further enable the computing device to:
   receive the first object from a uniform resource locator (URL) embedded in the QR code.

3. The computing device of claim 1, wherein the instructions, when excited by the processor, further enable the computing device to:
   determine at least one amount of lighting or a color of lighting on the QR code; and
   render the representation of the first object based at least in part on the at least one amount of lighting or the color of lighting on the QR code.

4. The computing device of claim 1, wherein the instructions, when excited by the processor, further enable the computing device to:
   determine the size of the QR code based at least in part upon information contained in the QR code.

5. A computer-implemented method, comprising:
   acquiring at least one image of a real-world environment containing a two-dimensional marker;
   determining a distance and orientation of the representation of the two-dimensional marker in the at least one image;
   determining at least one of an amount of lighting or a color of lighting associated with at least the two-dimensional marker;
   displaying a camera environment;
   displaying a representation of a first object to be displayed in the real-world environment in the camera environment, the representation of the first object appearing to be at the distance and orientation, the representation of the first object being displayed in the camera environment based at least in part on the at least one of the amount of lighting or the color of lighting associated with the two dimensional marker;
   determining a second object;
   removing the representation of the first object in the camera environment; and
   displaying a representation of the second object in the camera environment, the representation of the second object appearing to be at a relative distance and orientation such that the representation of the second object appears to be positioned in place of the two-dimensional marker.

6. The computer-implemented method of claim 5, wherein the displaying of the representation of the second object is
   based at least in part on the at least one of the amount of lighting or the color of lighting associated with at least the two-dimensional marker.

7. The computer-implemented method of claim 5, further comprising:
   deriving a transformation matrix from the two-dimensional marker, the transformation matrix affecting the scale and orientation of the first object displayed in the camera environment.

8. The computer-implemented method of claim 5, further comprising:
   identifying a first relative size of the two-dimensional marker; and
   determining a second relative size of the representation of the first object based at least on the first size of the two-dimensional marker.

9. The computer-implemented method of claim 5, further comprising:
   distorting a background of the camera environment based at least on the first object.

10. The computer-implemented method of claim 5, further comprising:
    receiving the object from a uniform resource locator (URL) embedded in the QR code.

11. The computer implemented method of claim 5, further comprising:
    causing an additional amount of lighting to the displayed in the camera environment and the representation of the first object.

12. The computer-implemented method of claim 5, wherein the two-dimensional marker is at least one of: a QR code, a piece of paper, an object with a known dimension, a grid, or a publication.

13. The computer-implemented method of claim 5, wherein the two-dimensional marker is a QR code, further comprising:
   determining the distance and orientation of the first object based at least in part upon two or more features contained in the QR code.

14. A computer-implemented method, comprising:
   under control of one or more computer systems configured with executable instructions,
   capturing, using an electronic device, a real-world environment including a two-dimensional marker;
   identifying the two-dimensional marker in the real-world environment;
   determining a relative size and an amount of distortion of the two-dimensional marker, the size being relative to the size of a first object;
   in response to determining the relative size and the amount of distortion of the two-dimensional marker, determining a plane associated with the two-dimensional marker with respect to the electronic device;
   displaying the real-world environment as a camera environment on a display screen of the electronic device;
   displaying a representation of the first object on the display screen, the representation of the first object being rendered with a size and amount of distortion such that the representation of the first object appears to be positioned in the place of the two-dimensional marker in the real-world environment as displayed in the camera environment;
   determining a second object;
   removing the representation of the first object in the camera environment; and
   displaying a representation of the second object on the display screen, the representation of the second object being rendered with a size and amount of distortion such that the representation of the second object appears to be positioned in the place of the two-dimensional marker in the real-world environment as displayed in the camera environment.

15. The computer-implemented method of claim 14, wherein the representation of the first object on the display screen occurs in real-time with respect to identifying the marker in the real-world environment.

16. The computer-implemented method of claim 14, further comprising:
   determining at least one of amount of lighting or a color of lighting of the two-dimensional marker;
   determining the rendered representation of the first object based at least in part on the at least one of amount of lighting or the color of lighting of the two-dimensional marker.

17. The computer-implemented method of claim 14, further comprising:
   determining the relative size and an amount of distortion based at least in part upon information embedded in a Quick Response (QR) code, wherein the two-dimensional marker is the QR code.

18. The computer-implemented method of claim 14, wherein the two-dimensional marker is at least one of: a QR code, a piece of paper, an object with a known dimension, a grid, or a publication.

19. The computer-implemented method of claim 14, wherein color of the representation of the first object may be adjusted.

20. The computer-implemented method of claim 14, wherein the two-dimensional marker is a QR code and further comprising:
   determining the distance and orientation of the first object based at least in part upon two or more features contained in the QR code.

* * * * *